United States Patent
Davydov et al.

(10) Patent No.: US 9,914,090 B2
(45) Date of Patent: Mar. 13, 2018

(54) VAPOR-LIQUID CONTACTING APPARATUSES AND METHODS FOR REMOVING CONTAMINANTS FROM GAS STREAMS

(71) Applicant: UOP LLC, Des Plaines, IL (US)

(72) Inventors: Lev Davydov, Northbrook, IL (US); Xiaoming Wen, Palatine, IL (US); Lubo Zhou, Inverness, IL (US)

(73) Assignee: UOP LLC, Des Plaines, IL (US)

( * ) Notice: Subject to any disclaimer, the term of this patent is extended or adjusted under 35 U.S.C. 154(b) by 607 days.

(21) Appl. No.: 13/931,649

(22) Filed: Jun. 28, 2013

(65) Prior Publication Data
US 2015/0000524 A1  Jan. 1, 2015

(51) Int. Cl.
*B01D 53/24* (2006.01)
*B01D 53/18* (2006.01)
(Continued)

(52) U.S. Cl.
CPC .............. *B01D 53/24* (2013.01); *B01D 53/18* (2013.01); *B01D 53/1418* (2013.01);
(Continued)

(58) Field of Classification Search
CPC .... B01D 53/1406; B01D 53/18; B01D 53/24; B01D 2252/204; B01D 2251/606;
(Continued)

(56) References Cited

U.S. PATENT DOCUMENTS

| | | | | |
|---|---|---|---|---|
| 2,847,200 A * | 8/1958 | Tom | ...................... | B01D 3/16 |
| | | | | 202/158 |
| 2,998,137 A * | 8/1961 | Zdenek | ................. | B01D 29/11 |
| | | | | 209/17 |

(Continued)

FOREIGN PATENT DOCUMENTS

| CA | 2144585 A1 | 6/1996 |
|---|---|---|
| CN | 2536289 Y * | 2/2003 |

(Continued)

OTHER PUBLICATIONS

Javed, et al., "The CO2 Capture Performance of a High-Intensity Vortex Spray Scrubber," Chemical Engineering Journal, vol. 162, Issue 2, Aug. 2010, pp. 448-456.
(Continued)

*Primary Examiner* — Amber R Orlando
*Assistant Examiner* — Stephen Hobson

(57) ABSTRACT

Vapor-liquid contacting apparatuses and methods for removing contaminants from gas streams are provided. In an embodiment, a vapor-liquid contacting apparatus includes a vortex contacting stage having a contacting zone bound by a wall and defining an axis, a radially inner region surrounding the axis, and a radially outer region adjacent the wall. The vapor-liquid contacting apparatus also includes a feed conduit configured to direct flow of a feed gas into the radially outer region of the contacting zone in a direction tangential to the axis to form a vortex. Further, the vapor-liquid contacting apparatus includes a liquid conduit con-
(Continued)

figured to deliver a liquid absorbent stream to the radially inner region in the contacting zone.

6 Claims, 4 Drawing Sheets

(51) Int. Cl.
  *B01J 19/24* (2006.01)
  *B01D 53/14* (2006.01)
(52) U.S. Cl.
  CPC .... *B01D 53/1468* (2013.01); *B01D 2251/306* (2013.01); *B01D 2251/606* (2013.01); *B01D 2252/204* (2013.01); *B01J 19/24* (2013.01); *B01J 19/245* (2013.01)
(58) Field of Classification Search
  CPC .......... B01D 2251/306; B01D 53/1468; B01D 53/1418; B01J 19/245; B01J 19/24
  See application file for complete search history.

(56) References Cited

U.S. PATENT DOCUMENTS

| | | | | | |
|---|---|---|---|---|---|
| 3,412,529 | A | * | 11/1968 | Tailor | B01D 50/00 261/112.1 |
| 3,620,509 | A | * | 11/1971 | Roman | B01D 47/08 261/18.1 |
| 3,802,161 | A | * | 4/1974 | Talbert | F24F 6/12 261/109 |
| 3,881,895 | A | * | 5/1975 | Wattles | B01J 19/006 95/219 |
| 3,989,485 | A | * | 11/1976 | Kilian | B01D 47/06 261/79.2 |
| 3,998,612 | A | * | 12/1976 | Lundy | B01D 47/10 261/62 |
| 4,162,901 | A | * | 7/1979 | Enegess | B01D 53/025 376/253 |
| 4,297,111 | A | * | 10/1981 | Ross | B01D 3/30 159/49 |
| 4,371,382 | A | * | 2/1983 | Ross | B01D 3/30 159/49 |
| 5,042,998 | A | * | 8/1991 | Beusen | B01D 45/12 55/338 |
| 5,472,567 | A | * | 12/1995 | Torregrossa | B01F 5/0057 162/38 |
| 6,054,046 | A | * | 4/2000 | Nelson | B01D 19/001 210/194 |
| 6,632,370 | B2 | * | 10/2003 | Natarius | B01D 53/14 210/170.08 |
| 8,238,049 | B2 | * | 8/2012 | Takei | G02B 7/08 359/694 |
| 8,268,049 | B2 | | 9/2012 | Davydov | |
| 9,114,350 | B2 | * | 8/2015 | Liu | B01D 53/1425 |
| 2009/0115076 | A1 | * | 5/2009 | Makhotkin | B01D 3/30 261/78.2 |
| 2010/0180767 | A1 | * | 7/2010 | Kelsey | B01D 19/0005 95/243 |
| 2010/0258427 | A1 | * | 10/2010 | Towler | B01D 3/30 203/42 |
| 2011/0219948 | A1 | * | 9/2011 | McCutchen | B01D 45/14 95/35 |
| 2011/0239862 | A1 | * | 10/2011 | Davydov | B01D 53/18 95/151 |
| 2012/0304538 | A1 | * | 12/2012 | Xu | B01D 53/1406 48/127.3 |
| 2015/0362198 | A1 | * | 12/2015 | Liaw | F24F 3/14 95/34 |

FOREIGN PATENT DOCUMENTS

| | | | | |
|---|---|---|---|---|
| DE | 2739516 | A1 | * 3/1979 | ............. B01D 45/12 |
| GB | 2089234 | A | * 6/1982 | ............... F28C 3/06 |
| JP | 2012061447 | A | 3/2012 | |
| KR | 100733323 | B1 | 6/2007 | |
| KR | 20100013181 | A | 2/2010 | |
| KR | 20110054866 | A | 5/2011 | |
| RU | 2259870 | C1 | 9/2005 | |
| RU | 2323035 | C2 | 4/2008 | |

OTHER PUBLICATIONS

Anon, "Confined Vortex Scrubber Offers High-Efficiency Acid Gas and Particulate Removal," Air Pollution Consultant, vol. 5, Issue 3, 1995, pp. 1.1-1.3.

Loftus, et al., "A Confined Vortex Scrubber for Fine Particulate Removal From Flue Gases," Environmental Progress, vol. 11, Issue 1, Feb. 1992, pp. 27-32.

Rohatgi, "Gas Absorption At a Liquid Surface Agitated by Vortex Rings," Canadian Journal of Chemical Engineering, vol. 59, Issue 3, Jun. 1981, pp. 303-309.

* cited by examiner

VAPOR-LIQUID CONTACTING APPARATUSES AND METHODS FOR REMOVING CONTAMINANTS FROM GAS STREAMS

TECHNICAL FIELD

The technical field generally relates to vapor-liquid contacting apparatuses and methods for removing contaminants from gas streams in vapor-liquid contacting apparatuses, and more particularly relates to methods and apparatuses for contacting vapor and liquid in vortex contacting stages.

BACKGROUND

Vapor-liquid contacting devices, such as fractionation trays and packings, are employed to perform an almost endless variety of separations in the petroleum and petrochemical industries. Fractionation trays are used, for example, in the separation of many different hydrocarbons such as paraffins, aromatics and olefins. Vapor-liquid contacting trays are also used to perform gas processing, purification, and absorption.

Vapor-liquid contact has traditionally been conducted in cross flow or counter current contacting devices having an overall downward liquid flow and upward vapor flow. At some point in the apparatus the vapor and liquid phases are brought into contact to allow the vapor and liquid phases to exchange components and approach equilibrium with each other. The vapor and liquid are then separated, moved in the appropriate direction and contacted again with another quantity of the appropriate fluid. In many conventional vapor-liquid contacting devices, vapor and liquid are contacted in a cross flow arrangement at each stage. An alternative apparatus differs from traditional multi-stage contacting systems in that while the overall flow in the apparatus continues to be countercurrent, each stage of actual contacting between the liquid and vapor phases is performed in a co-current mass transfer zone.

During fractional distillation processes using conventional trays, vapor generated at the bottom of the column rises through a large number of small perforations spread over the decking area of the tray, which supports a quantity of liquid. The passage of the vapor through the liquid generates a layer of bubbles referred to as froth. The high surface area of the froth helps to quickly establish a compositional equilibrium between the vapor and liquid phases on the tray. The froth is then allowed to separate into vapor and liquid. During mass transfer, the vapor loses less volatile material to the liquid and thus becomes slightly more volatile as it passes upward through each tray. Simultaneously the concentration of less volatile compounds in the liquid increases as the liquid moves downward from tray to tray. The liquid separates from the froth and travels downward to the next lower tray. This continuous froth formation and vapor-liquid separation is performed on each tray. Vapor-liquid contactors therefore perform the two functions of contacting the rising vapor with liquid and then allowing the two phases to separate and flow in different directions. When the steps are performed a suitable number of times on different trays, the process leads to separation of chemical compounds based upon their relative volatility.

If maldistribution or an unbalanced load of liquid occurs in a conventional vapor-liquid tray contacting apparatus, fluid may not be readily redistributed along the length of the apparatus. Thus, maldistribution of liquid or vapor may propagate from one stage to the next, reducing the capacity and efficiency of the apparatus. Further, unbalanced or maldistributed liquid in contacting stages of a vapor-liquid contacting apparatus may result frequently from operation under non-vertical conditions, i.e., if the vessel itself is rocking or tilted.

Accordingly, it is desirable to provide a vapor-liquid contact apparatus that avoids the issue of maldistribution of liquid in contacting stages. Further, it is desirable to provide vapor-liquid contacting apparatuses and methods with improved contacting and separation efficiency. It is also desirable to provide a vapor-liquid contacting apparatus and method that utilizes vortex contacting stages. Furthermore, other desirable features and characteristics will become apparent from the subsequent detailed description and the appended claims, taken in conjunction with the accompanying drawings and the foregoing technical field and background.

BRIEF SUMMARY

Vapor-liquid contacting apparatuses and methods for removing contaminants from gas streams are provided. In one exemplary embodiment, a vapor-liquid contacting apparatus includes a vortex contacting stage having a contacting zone bound by a wall and defining an axis, a radially inner region surrounding the axis, and a radially outer region adjacent the wall. The vapor-liquid contacting apparatus also includes a feed conduit configured to direct flow of a feed gas into the radially outer region of the contacting zone in a direction tangential to the axis to form a vortex. Further, the vapor-liquid contacting apparatus includes a liquid conduit configured to deliver a liquid absorbent stream to the radially inner region in the contacting zone.

In another embodiment, a multistage vapor-liquid contacting apparatus is provided. The multistage vapor-liquid contacting apparatus includes a vertically disposed cylindrical wall defining an axis. The multistage vapor-liquid contacting apparatus further includes an upper vortex contacting stage having an upper contacting zone bound by the cylindrical wall and a lower vortex contacting stage having a lower contacting zone bound by the cylindrical wall and defining a radially inner region surrounding the axis. A gravity fed liquid conduit is configured to direct a liquid absorbent from the upper vortex contacting zone to the radially inner region of the lower contacting zone. Also, a vapor conduit is configured to direct a treated gas from the lower vortex contacting zone to the upper vortex contacting zone.

In another embodiment, a method for removing a contaminant from a gas stream is provided. The method includes providing a first vortex contacting stage having a first contacting zone bound by a wall and defining an axis, a first radially inner region surrounding the axis, and a first radially outer region adjacent the wall. In the method, a vortex is formed in the first contacting zone by directing the gas stream into the first radially outer region of the first contacting zone in a direction tangential to the axis. A liquid absorbent stream is delivered to the first radially inner region in the first contacting zone. The method contacts the liquid absorbent stream and the gas stream and absorbs the contaminant into the liquid absorbent stream.

BRIEF DESCRIPTION OF THE DRAWINGS

Embodiments of vapor-liquid contacting apparatuses and methods for removing contaminants from gas streams will hereinafter be described in conjunction with the following drawing figures, wherein like numerals denote like elements, and wherein.

DETAILED DESCRIPTION

The following detailed description is merely exemplary in nature and is not intended to limit the vapor-liquid contacting apparatuses and methods for removing contaminants from gas streams. Furthermore, there is no intention to be bound by any theory presented in the preceding background or the following detailed description.

Vapor-liquid contacting apparatuses and methods for removing contaminants from gas streams are provided herein. The apparatuses and methods enable efficient vapor-liquid contact at non-stationary, such rocking or tilted, locations. Specifically, the apparatuses and methods provide for formation of a liquid-vapor mixture from vortex forces. Specifically, a vapor stream is tangentially directed into a contacting zone in a cylindrical column to induce a vortex or rotating vapor mass with a low pressure inner region. A liquid stream is introduced to the low pressure inner region, and disperses outwardly into contact with the vapor. Along its periphery, liquid flows to the bottom of the contacting zone before exiting the contacting zone. Gas moves inwardly through the liquid-vapor mixture toward the low pressure inner region before exiting upwardly from the contacting zone. Centripetal forces ensure sufficient vapor-liquid contact despite the non-vertical or non-stationary orientation of the column. In exemplary embodiments, the centripetal forces of the vortex are in the range of 10 g to 20 g, wherein 1 g is the acceleration due to gravity on earth.

Figure 1:
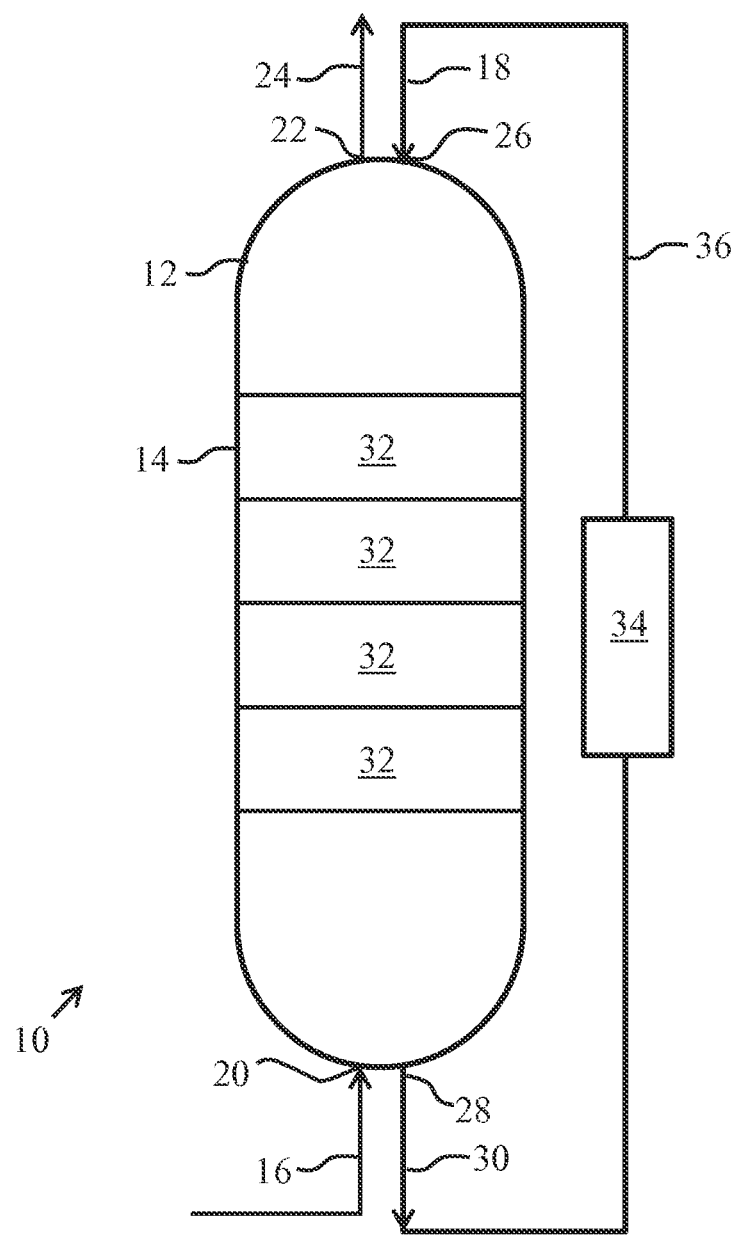
FIG. 1 is a schematic diagram of an embodiment of a vapor-liquid contacting apparatus and method in accordance with an embodiment.

In an embodiment, and as shown in FIG. 1, a vapor-liquid contacting apparatus 10 includes a reactor or column 12 having a cylindrical wall 14. As shown, the column 12 provides for counterflow contact between a vapor stream 16 and a liquid stream 18. Specifically, the column 12 includes a vapor inlet 20 at its bottom end for receiving the vapor stream 16 and a vapor outlet 22 at its top end for emitting a cleaned or treated vapor stream 24. Further, the column 12 includes a liquid inlet 26 at its top end for receiving the liquid stream 18 and a liquid outlet 28 at its bottom end for discharging a spent or contaminant-rich liquid stream 30. The vapor stream 16 and the liquid stream 18 are contacted at a series of contacting stages 32. In FIG. 1, the apparatus 10 includes a series of four contacting stages 32; however, an exemplary apparatus may include two to five contacting stages 32. As shown in FIG. 1, the vapor-liquid contacting apparatus 10 may include a regeneration zone 34 for removing a contaminant from the contaminant-rich liquid stream 30 to form the fresh liquid stream 18.

In an exemplary embodiment, the vapor stream 16 is a feed gas stream including an admixture of methane, ethane, hydrogen sulfide, and carbon dioxide. Hydrogen sulfide and carbon dioxide are considered to be acid contaminants that cause the vapor stream 16 to be "sour". In the exemplary embodiment, the liquid stream 18 is an acid contaminant absorbent, such as an amine-based solvent or an aqueous potassium carbonate solution. As the vapor stream 16 travels upward through the column 12 countercurrently to the descending liquid stream 18, vapor-liquid contact occurs at each contacting stage 32, and the contaminants are absorbed from the vapor stream 16 by the liquid stream 18. After sufficient contact, the treated vapor stream 24 and the contaminant-rich liquid stream 30 are formed.

The column 12 is operated at conditions which effect a fairly selective removal of the hydrogen sulfide and carbon dioxide from the vapor stream 16 to result in the production of a treated vapor stream 24 that has a lower hydrogen sulfide concentration and/or carbon dioxide concentration than the vapor stream 16 but still contains substantially all of the other components of the vapor stream 16 at the same quantity as the vapor stream 16. The contaminant-rich liquid stream 30 is relatively rich in hydrogen sulfide and/or carbon dioxide as compared to the liquid stream 18 entering the column 12.

After passing through the column 12, the contaminant-rich liquid stream 30 enters the regeneration zone 34 maintained at an elevated temperature. An exemplary regeneration zone 34 includes a catalyst promoting reaction of hydrogen sulfide with thiosulfate present in the contaminant-rich liquid stream 30. This results in a reduction of the thiosulfate to elemental sulfur. The contaminant-rich liquid stream 30 may further undergo oxidation and stripping which results in the release of the carbon dioxide present in the contaminant-rich liquid stream 30. This forms a lean liquid stream 36 that is recycled to the column 12.

Figure 2:
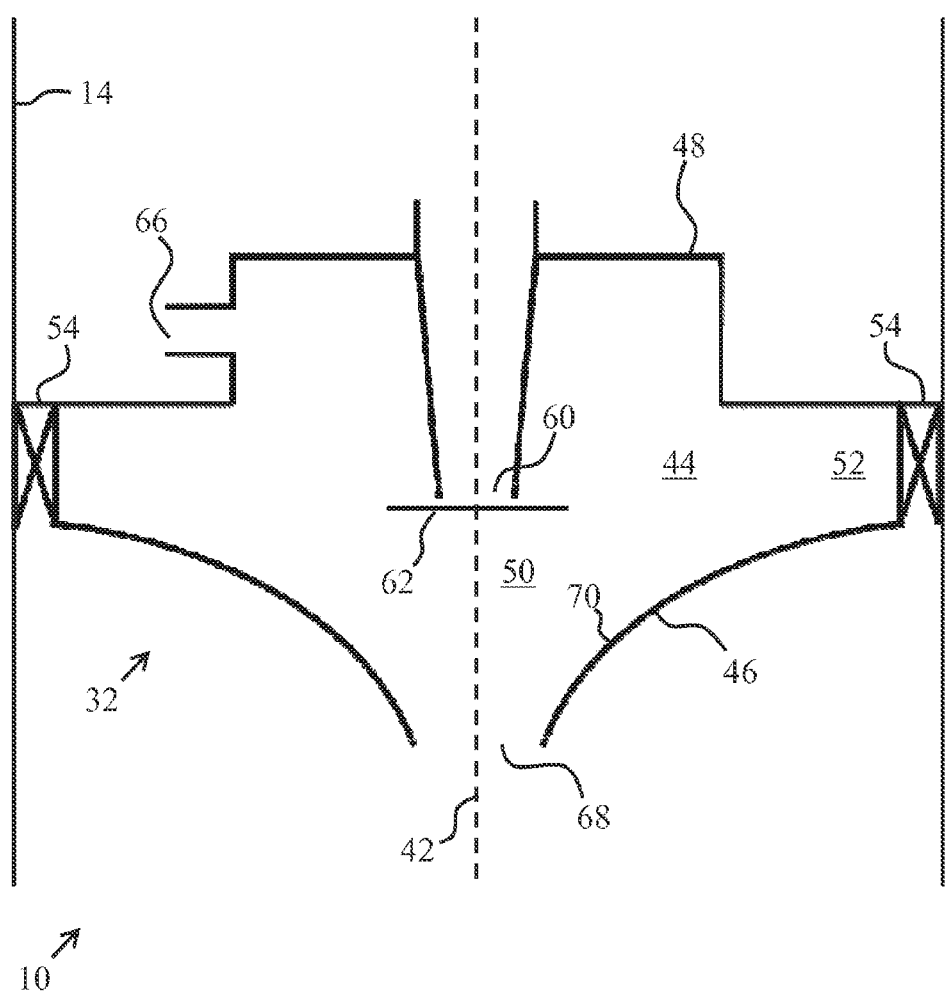
FIG. 2 is a schematic diagram of a vortex vapor-liquid contacting stage as shown in FIG. 1 in accordance with an embodiment.

In an exemplary embodiment, each contacting stage 32 in the column 12 is a vortex contacting zone. FIG. 2 illustrates the structure of a single vortex contacting stage 40. As shown, the cylindrical wall 14 of the vapor-liquid contacting apparatus 10 defines an axis 42. The vortex contacting stage 40 is oriented substantially perpendicular to the axis 42. The vortex contacting stage 40 defines a vortex contacting zone 44 that is bound by the cylindrical wall 14, by a downcomer 46, and by a stage ceiling 48. The vortex contacting zone 44 includes a radially inner region 50 surrounding the axis 42 and a radially outer region 52 adjacent the cylindrical wall 14. Further, the vortex contacting stage 40 includes peripherally spaced vapor feed conduits or inlets 54 configured to direct flow of the vapor stream into the radially outer region 52 of the vortex contacting zone 44 in a direction tangential to the axis 42 to form a vortex. Specifically, exemplary vapor feed conduits are formed with guiding vanes that impart the tangential flow of the vapor stream into the vortex contacting zone 44. In FIG. 2, the illustrated vapor feed conduits 54 introduce the vapor feed in a same rotational direction about the axis, i.e., in the same clockwise or counterclockwise direction.

As shown, the vortex contacting stage 40 includes a liquid conduit or inlet 60 that is configured to deliver the liquid stream to the radially inner region 50 in the vortex contacting zone 44. Further, the exemplary vortex contacting stage 40 includes a dispersion plate 62 in the path of entering liquid to interrupt flow of the liquid stream in the radially inner region.

The vortex contacting stage 40 includes a vapor outlet 66 located in the stage ceiling 48 to allow vapor to flow upward out of the vortex contacting zone 44. Further, the vortex contacting stage 40 includes a liquid outlet 68 located at the bottom end of the vortex contacting stage 40 to allow liquid to flow out of the vortex contacting stage 40 due to gravity.

An exemplary liquid outlet 68 is centered about the axis 42. As shown, the downcomer 46 has an inwardly tapering surface 70 to direct liquid to the liquid outlet 68. An exemplary downcomer 46 has a parabolic-shaped and inwardly tapering surface 70. The parabolic-shape of the downcomer 46 stabilizes the vortex formed by the flow of the vapor stream into the radially outer region 52 of the vortex contacting zone 44.

Figure 3:
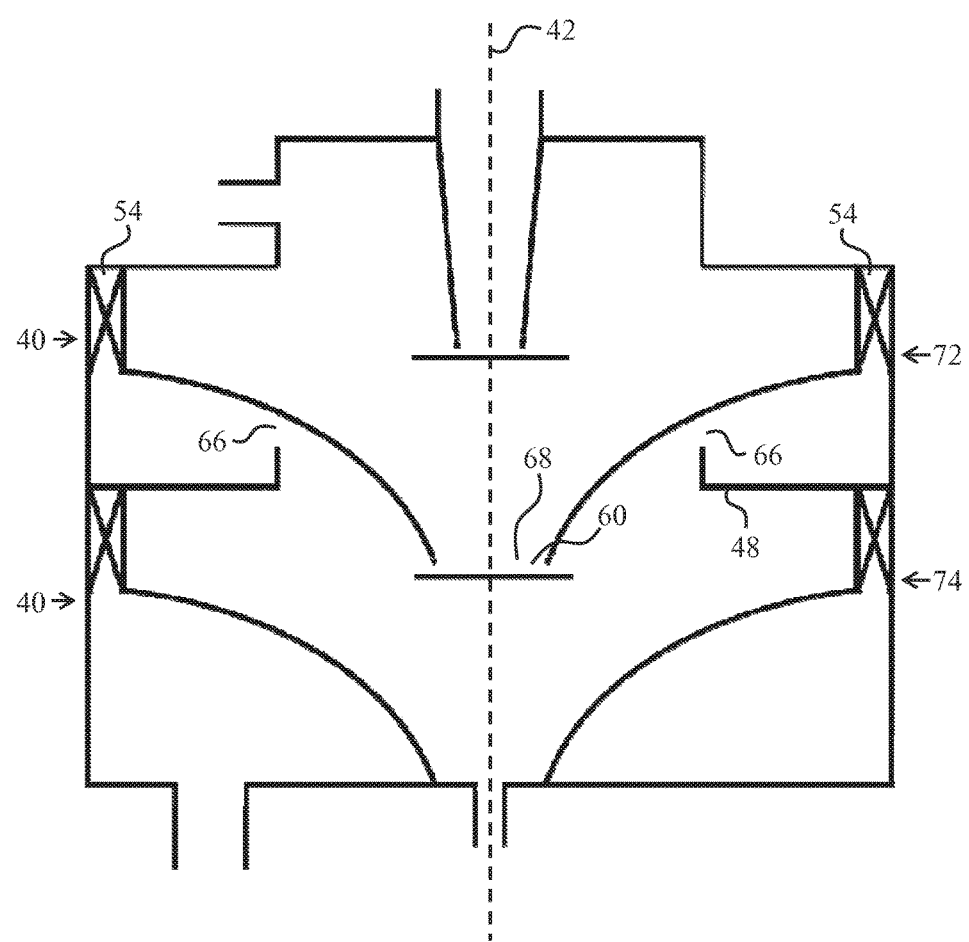
FIG. 3 is a schematic diagram of adjacent vortex vapor-liquid contacting stages as shown in FIG. 1 in accordance with an embodiment.

Referring now to FIG. 3, the structural arrangement between two adjacent vortex contacting stages 40, including an upper vortex contacting stage 72 and a lower vortex contacting stage 74 is illustrated. As shown, the liquid outlet 68 of the upper vortex contacting stage 72 forms the liquid inlet 60 of the lower vortex contacting stage 74. With this structure, no pumps are necessary to transport the liquid stream from the upper vortex contacting stage 72 to the lower vortex contacting stage 74. Rather, the liquid stream descends from stage to stage only due to gravity.

As further shown in FIG. 3, the vapor outlet 66 located in the stage ceiling 48 of lower vortex contacting stage 74 is in fluid communication with the peripherally spaced vapor feed conduits 54 in the upper vortex contacting stage 72. As shown, no interstage compressors or pumps are needed to direct the vapor stream from the lower vortex contacting stage 74 to the upper vortex contacting stage 72. Rather, the exothermic nature of the vapor-liquid contact absorption process provides sufficient energy to the rising vapor stream to form a vortex in the upper vortex contacting stage 72 when directed tangentially to the axis 42 by the vapor feed conduits 54 in the upper vortex contacting stage 72.

Figure 4:
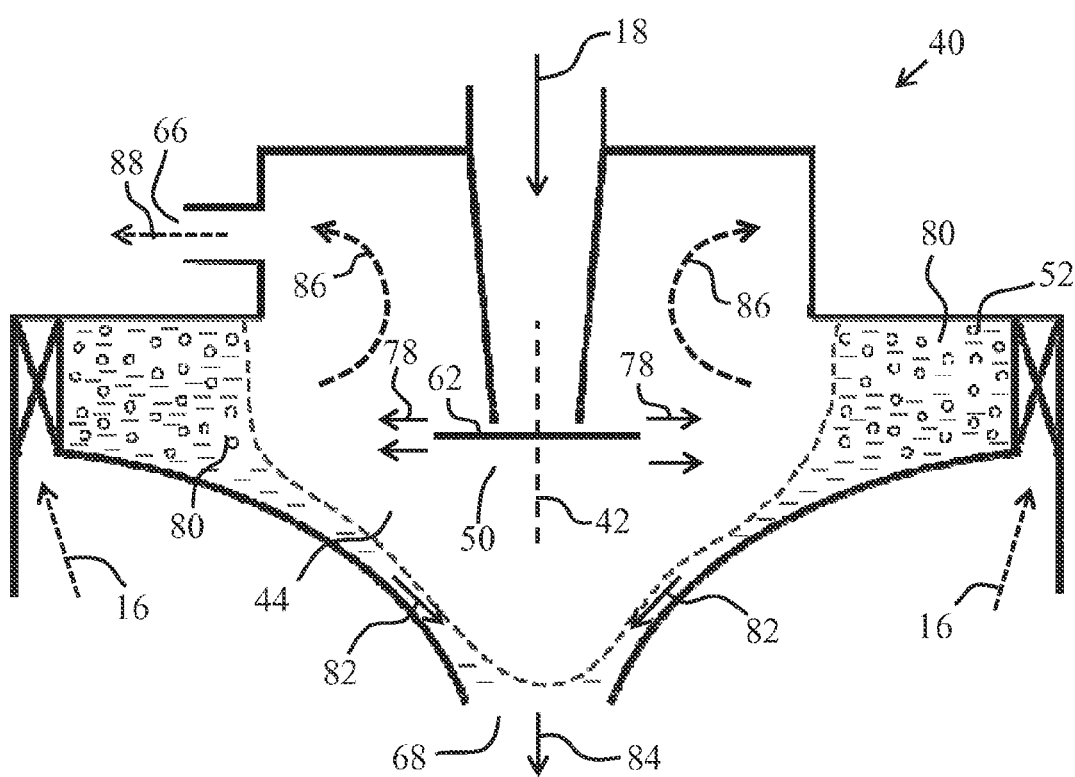
FIG. 4 is a schematic diagram of the vortex vapor-liquid contacting stage of FIG. 2, illustrating liquid and gas flows in accordance with an embodiment.

In FIG. 4, the contact between vapor and liquid in a vortex contacting stage 40 is more clearly illustrated. A vortex is created in vortex contacting zone 40 by the rotational flow of the vapor stream resulting from tangentially directing the vapor stream from the vapor conduits about the axis. The vortex created by the tangential vapor flow causes a pressure drop at the radially inner region 50 in the vortex contacting zone 44. When the liquid stream 18 enters the vortex contacting zone 44 it impacts the dispersion plate 62 and forms droplets. The droplets are pulled away from the axis 42 to the radially outer region 52 in the direction of arrows 78 where a highly dispersed vapor-liquid mixture 80 is formed and is held in a field of centripetal forces. At the same time, vapor 16 entering the vortex contacting zone 40 is drawn through the vapor-liquid mixture 80 toward the low pressure radially inner region 50. Rotational energy dissipates at the lower edge of the vapor-liquid mixture 80, and vapor and liquid separate. The liquid flows along the downcomer 46 in the direction of arrows 82 and exits the liquid outlet 68 in the direction of arrow 84, while the vapor moves upward in the direction of arrows 86 and exits the vapor outlet 66 in the direction of arrow 88.

As described, the vapor-liquid contacting apparatus 10 need not be maintained at a static vertical orientation. In other words, unlike contact trays, the vortex contacting zone does not require an equal distribution of liquid under the force of gravity. Instead, the vortex contacting zone utilizes the centripetal forces of the vortex, such as in the range of 10 g to 20 g, to impart movement of and contact between the liquid and vapor. Due to the strong centripetal forces, rocking conditions do not affect the vortex formation and vapor-liquid contact. Thus, the vortex formed by the vapor and liquid can be formed under tilted or rocking conditions such as on offshore stations. Therefore the apparatus and method described in relation to FIGS. 1-4 may be particularly suited to offshore or other non-stationary applications. Further, the apparatus and method described in relation to FIGS. 1-4 does not require interstage compressors or pumps, which significantly reduces the footprint and cost of the apparatus. Also, the apparatus and method described in FIGS. 1-4 avoids use of moving parts, which simplifies operation and increases operational lifetime.

As described herein, a vapor-liquid contacting apparatus and method for removing contaminants from gas streams have been provided. In exemplary embodiments, a multistage contacting apparatus including a series of vortex vapor-contact zones and method have been described for processing gas streams. The apparatus and method described above are particularly well-suited for use in non-stationary and/or non-vertical conditions.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the claimed subject matter in any way. Rather, the foregoing detailed description will provide those skilled in the art with a convenient road map for implementing an exemplary embodiment or embodiments. It being understood that various changes may be made in the function and arrangement of elements described in an exemplary embodiment without departing from the scope set forth in the appended claims.

What is claimed is:

1. A vapor-liquid contacting apparatus consisting of:
a vortex contacting stage having a contacting zone bound by a wall and defining an axis, a radially inner region surrounding the axis, and a radially outer region adjacent the wall;
a vapor inlet configured to receive a vapor stream and a vapor outlet configured to emit a cleaned vapor stream;
a feed conduit configured to direct flow of a feed gas into the radially outer region of the contacting zone in a direction tangential to the axis to form a vortex;
a liquid conduit having a liquid inlet and configured to deliver a liquid absorbent stream to the radially inner region in the contacting zone wherein said liquid conduit is located at a top of said vapor-liquid contacting apparatus to deliver the liquid absorbent stream to a dispersion plate and a liquid outlet configured to discharge a spent liquid stream; and
a regeneration zone configured to remove a contaminant from a contaminant-rich liquid stream.

2. The vapor-liquid contacting apparatus of claim 1 wherein the feed conduit comprises a first feed conduit and a second feed conduit, wherein said first feed conduit and said second feed conduit are configured to direct flow of the feed gas into the radially outer region of the contacting zone in a direction tangential to the axis to form a vortex.

3. A multistage vapor-liquid contacting apparatus consisting of:
a vertically disposed cylindrical wall defining an axis;
an upper vortex contacting stage having an upper contacting zone bound by the cylindrical wall;
a lower vortex contacting stage having a lower contacting zone bound by the cylindrical wall and defining a radially inner region surrounding the axis;
a vapor inlet for receiving a vapor stream and a vapor outlet for emitting a cleaned or treated vapor stream;
a gravity fed liquid conduit configured to direct a liquid absorbent from the upper contacting zone to the radially inner region of the lower contacting zone wherein said gravity fed liquid conduit is located at a top of said vapor-liquid contacting apparatus;

a vapor conduit configured to direct a treated gas from the lower contacting zone to the upper contacting zone and a regeneration zone.

4. The multistage vapor-liquid contacting apparatus of claim 3 wherein the lower contacting zone defines a radially outer region adjacent the cylindrical wall.

5. The multistage vapor-liquid contacting apparatus of claim 4 wherein the upper contacting zone defines a radially outer region adjacent the cylindrical wall, and wherein the vapor conduit is configured to direct flow of the treated gas into the radially outer region of the upper contacting zone in a direction tangential to the axis.

6. The multistage vapor-liquid contacting apparatus of claim 5 wherein the upper contacting zone defines a radially inner region surrounding the axis, and wherein the gravity fed liquid conduit is configured to direct the liquid absorbent from the radially inner region of the upper contacting zone to the radially inner region of the lower contacting zone.

* * * * *